United States Patent [19]

Crick et al.

[11] Patent Number: 5,675,793
[45] Date of Patent: Oct. 7, 1997

[54] DYNAMIC ALLOCATION OF A COMMON BUFFER FOR USE BY A SET OF SOFTWARE ROUTINES

[75] Inventors: Andrew P. R. Crick, Woodinville; Seetharaman Harikrishnan, Bellevue; Harish K. Naidu; William G. Parry, both of Redmond, all of Wash.

[73] Assignee: Microsoft Corporation, Redmond, Wash.

[21] Appl. No.: 582,219

[22] Filed: Jan. 3, 1996

Related U.S. Application Data

[63] Continuation of Ser. No. 954,474, Sep. 30, 1992, abandoned.
[51] Int. Cl.[6] .................................................. G06F 12/02
[52] U.S. Cl. ........................ 395/651; 395/497.01
[58] Field of Search ................................. 395/250, 700, 395/497.01, 651

[56] References Cited

U.S. PATENT DOCUMENTS

| 5,247,674 | 9/1993 | Kogure | 395/650 |
| 5,367,637 | 11/1994 | Wei | 395/250 |

FOREIGN PATENT DOCUMENTS

| 0 456 275 | 5/1991 | European Pat. Off. . |

OTHER PUBLICATIONS

Hanson, David R., "Fast Allocation and Deallocation of Memory Based on Object Lifetimes," *Software—Practice and Experience*, vol. 20(1), Jan. 1990, pp. 5–12.

"Termination of a Pool of Memory Selectors with a Single API Call," *IBM Technical Disclosure Bulletin*, IBM Corp., vol. 35, Jun. 1992, pp. 384–385.

Kernighan et al., "The C Programming Language," 1978, pp. 96–99.

Kernighan et al., "The C Programming Language," Prentice–Hall, 1978, pp. 173–177.

Kernighan et al., "The C Programming Language," Second Edition, Prentice–Hall, 1988, pp. 185–189.

*Primary Examiner*—Richard L. Ellis
*Attorney, Agent, or Firm*—Seed and Berry LLP

[57] ABSTRACT

A computer method and system for allocating memory for a plurality of software routines. Before execution of the software routines, a collective buffer is allocated. Each software routine is assigned an offset within the collective buffer. Each software routine may then use the portion of the collective buffer starting at its offset as its dynamically allocated work space. To allocate the collective buffer, a collective buffer size is first determined which is sufficient to satisfy the total dynamic memory requirements of the software routines. In determining the collective buffer size, the size of a software routine buffer required by each software routine is accumulated into the collective buffer size. As each software routine buffer size requirement is accumulated, the interim total is stored as the offset for the next software routine. When the last software routine buffer size requirement is accumulated, the total indicates the collective buffer size. A collective buffer of the collective buffer size is then allocated. When the software routines are executed, each software routine uses a portion of the collective buffer referenced by its assigned offset. When all the software routines complete execution, the collective buffer may then be deallocated. In a preferred embodiment, the memory is allocated to a software system having a layered architecture including an application program and a device driver comprising a plurality of component device drivers.

32 Claims, 6 Drawing Sheets

DYNAMIC ALLOCATION OF A COMMON BUFFER FOR USE BY A SET OF SOFTWARE ROUTINES

CROSS-REFERENCE TO RELATED APPLICATION

This application is a continuation of U.S. patent application Ser. No. 07/954,474, filed Sep. 30, 1992, now abandoned.

TECHNICAL FIELD

The present invention relates generally to the field of computer architecture, and more particularly to a method and system for reducing memory allocation requests in a layered architecture.

BACKGROUND OF THE INVENTION

A computer system may execute a number of software routines. These software routines may require the dynamic memory allocation and deallocation of a particular amount of available computer memory to use as work space. In dynamic memory allocation, memory is allocated as needed during execution of software routines. In a typical computer system, when a software routine starts execution, it requests the dynamic allocation of computer memory. As the software routine completes execution, it deallocates the allocated computer memory. The deallocated computer memory is then available for reallocation. Typically, such an allocation and deallocation occurs every time a software routine is invoked. Thus, where a large number of software routines must be invoked, a corresponding large number of computer memory allocations and deallocations are required.

Conventionally, computer memory allocations and deallocations are performed by an operating system within the computer system at the request of a software routine. These allocations and deallocations require the operating system to determine available portions of the computer memory and assign these available portions to the requesting software routine. This requires, for example, that pointers to these available portions be updated upon every allocation and deallocation of computer memory within the computer system. Thus, each allocation and deallocation of computer memory is time consuming and decreases the efficiency of the computer system.

SUMMARY OF THE INVENTION

An object of the present invention is to provide a computer method and system for dynamically allocating a collective buffer of computer memory to a plurality of software routines.

Another object of the present invention is to provide a computer method and system for maintaining, for each software routine, an offset that indicates the location of work space within the collective buffer provided for that software routine.

Another object of the present invention is to provide a computer method and system for allocating a collective device driver buffer to a plurality of component device drivers prior to execution of any of the component device drivers and accessing corresponding portions of the collective device driver buffer as work space for each component device driver invoked to process an input/output (I/O) operation.

These and other objects, which become apparent as the invention is more fully described below, are obtained by a computer method and system for allocating memory for a plurality of software routines, described as follows. Before execution of the software routines, a collective buffer is allocated. Each software routine is assigned an offset within the collective buffer. Each software routine may then use the portion of the collective buffer starting at its offset as its dynamically allocated work space. Before allocating the collective buffer, a collective buffer size is first determined which is sufficient to satisfy the total dynamic memory requirements of the software routines. In determining the collective buffer size, the size of a software routine buffer required by each software routine is accumulated into the collective buffer size. As each software routine buffer size requirement is accumulated, the total is stored as the offset for the next software routine. When the last software routine buffer size is accumulated, the total indicates the collective buffer size. The collective buffer of the collective buffer size is then allocated. When the software routines are performed, each software routine uses a portion of the collective buffer referenced by its assigned offset. When all the software routines complete execution, the collective buffer may then be deallocated.

In a preferred embodiment, the memory is allocated to a software system having a layered architecture including an application program and a device driver comprising a plurality of component device drivers. Each component device driver when executed performs functions necessary to process an I/O request from the application program. A device driver buffer is allocated having a size based on a total of the work space requirements of all of the component device drivers. Upon an I/O request by the application program, a call-down table is accessed which contains a call-down table entry for each component device driver. The call-down table entry contains a pointer to the corresponding component device driver and an offset within the device driver buffer. Each component device driver processes the I/O request using a portion of the device driver buffer beginning at this offset as its work space.

DETAILED DESCRIPTION OF THE INVENTION

Figure 1:
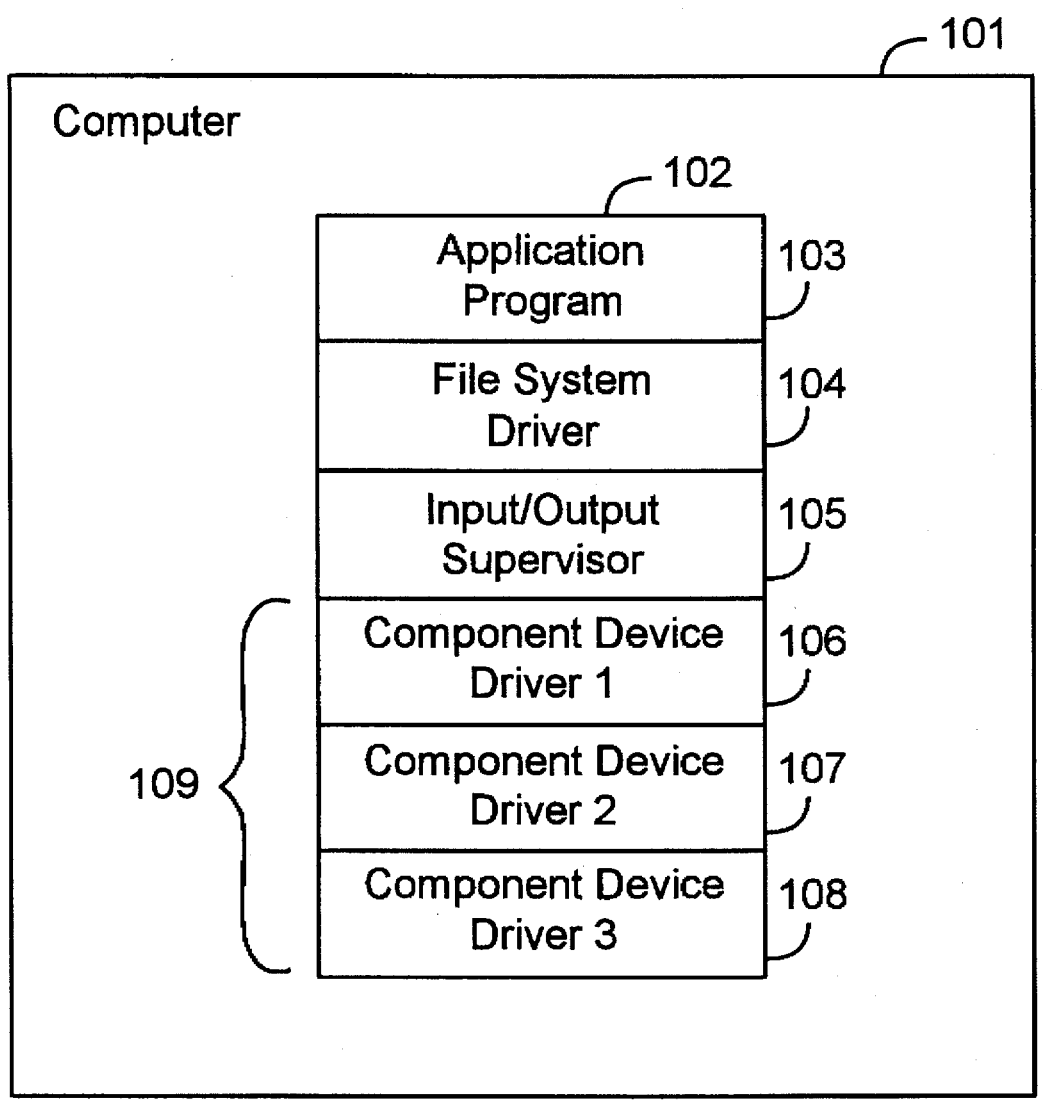
FIG. 1 is a block diagram showing a computer with a software system having a layered architecture.

FIG. 1 is a block diagram showing a computer with a software system having a layered architecture. The computer 101 includes I/O devices, memory, and a processor (not shown). Within the memory is stored a layered architecture system 102 which is executed by the processor. The layered architecture system comprises an application program 103, a file system driver 104, I/O supervisor (IOS) 105, and device driver 109. Device driver 109 comprises component device drivers 106, 107, and 108. The component device drivers 106, 107, and 108 each perform a specific function related to accessing a corresponding device. The component drivers are configured into the device driver during startup of the computer system.

The layered architecture system is shown in FIG. 1 as its components 103–108 are conceptually related as layers. Computer programs in the higher layers request services of the computer programs in the lower layers. For example, application program 103 requests services of the file system driver 104 by sending it file system requests, such as file read or write requests. The file system driver 104 receives these file system requests and performs functions such as converting a file read request (to read a particular location in a file) to a request to read a corresponding location relative to the actual disk address at which the file is stored. The file system driver then passes on the request to read data to the I/O supervisor 105.

The I/O supervisor passes on the read request to the device driver 109 by invoking component device driver 106. Each component device driver when executed performs a particular function relating to retrieving data from the disk. For example, component device driver 106 may implement disk caching, component device driver 107 may encrypt/decrypt data and component device driver 108 may directly access the disk for reading and writing data. Thus, upon a request to read data that happens to be stored in a cache buffer, the device driver 106 retrieves the data from its cache buffer to satisfy this request. If, however, the data is not stored within the cache buffer, then the request cannot be satisfied by the component device driver 106, and component device driver 106 passes on the request to component device driver 107. Component device driver 107 may, for example, encrypt and decrypt data transferred to and from the disk. Because the file system request is a read request, component device driver 107 Cannot satisfy the request, but passes on the request to component device driver 108. Component device driver 108 actually retrieves the data from the disk and returns the data to component device driver 107. Component device driver 107 then decrypts the data and passes the data to component device driver 106. Component device driver 106 passes the data to the I/O supervisor 105 after storing the data in its cache buffers. The I/O supervisor 105 passes the data to the file system driver 104, and finally the file system driver 104 passes the data to the application program 103.

There are many advantages to a layered software architecture. For example, each of the layers can be developed and tested independently of one another. One software developer could develop component device driver 106, which performs the disk caching. Another software developer could develop component device driver 107 to encrypt and decrypt data. So long as the interfaces between the layers are well defined, the various component device drivers can be configured properly into a layered architecture as described above. Such a layered architecture is described in U.S. patent application Ser. No. 07/954,920 entitled "Method and System for Configuring and Executing Device Drivers," which is hereby incorporated by reference.

A disadvantage of a layered architecture occurs, however, when each layer is required to be separately allocated the work space memory necessary to perform its function. For example, when component device driver 106 is invoked to perform disk caching, it would request the operating system to provide a memory allocation of work space for it to perform the disk caching. Before returning, the component device driver 106 would request deallocation of its work space memory. Similarly, component device drivers 107 and 108 would also request allocations and deallocations of work space memory. This allocation and deallocation of work spaces for each component driver may result in unacceptable burden on the computer system.

The present invention reduces this burden by allocating, prior to executing software routines (e.g. component device drivers), an amount of memory necessary to satisfy the requirements of all the software routines. A collective buffer is created having a collective buffer size sufficient to satisfy a total of all of these memory requirements. Offsets are stored for each software routine, calculated from the individual memory requirements of that software routine, for locating a corresponding software routine buffer within the collective buffer which contains the work space for that software routine.

In a preferred embodiment, the operating system allocates, prior to invocation of the component device drivers, memory sufficient to satisfy the memory requirements of all component device drivers. The memory requirement of each such component device driver is determined and accumulated to calculate the size of a device driver buffer necessary to contain the work space for all component device drivers. These memory requirements are also used to determine offsets which are used by each component device driver to reference its own work space within the collective buffer.

Figure 2:
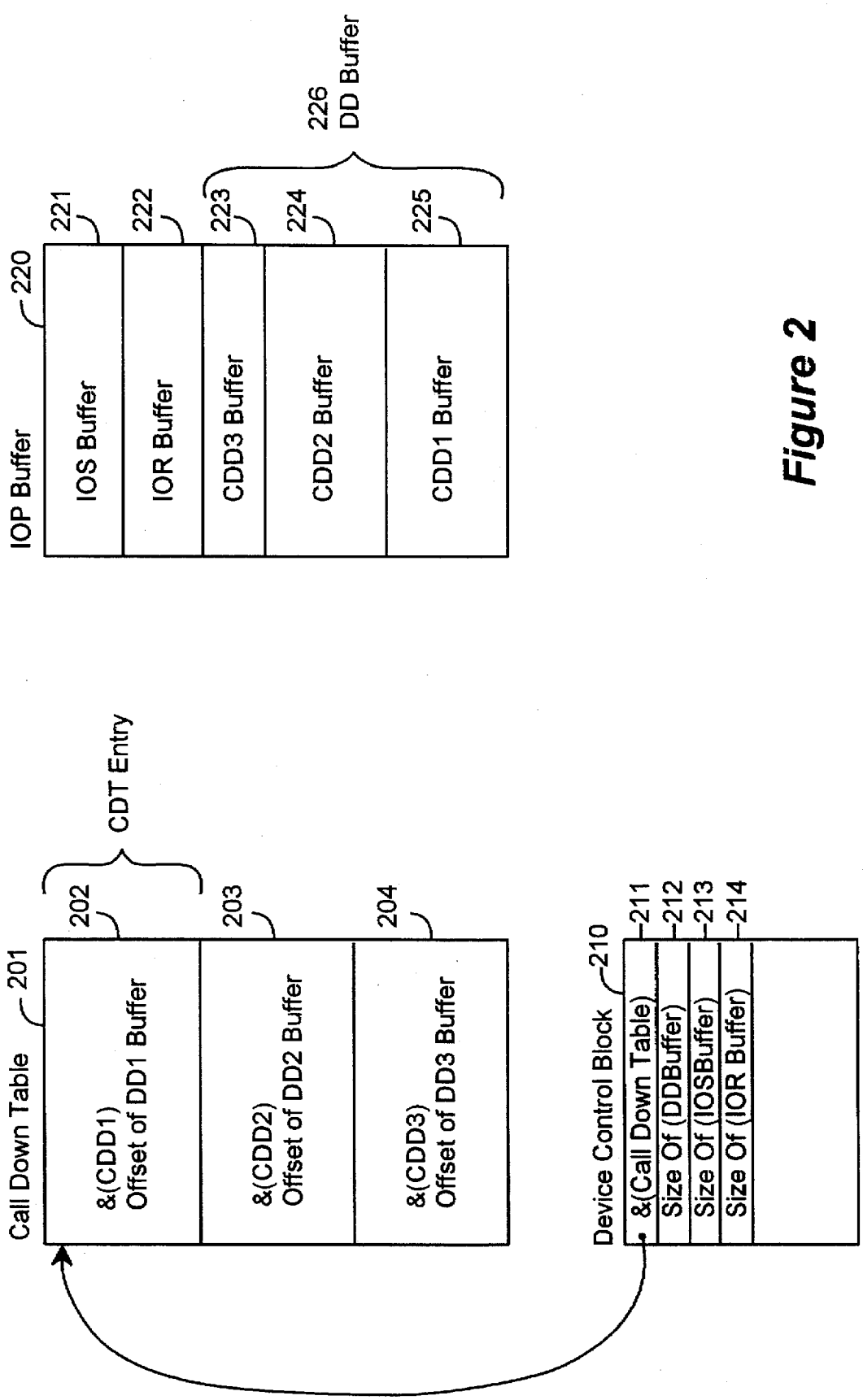
FIG. 2 is a block diagram illustrating sample data structures of the present invention.

FIG. 2 is a block diagram illustrating sample data structures of the present invention. The I/O supervisor maintains in memory a device control block 210 for each peripheral device. The device control block 210 contains the address of a call-down table (CDT) 201. The call-down table contains a CDT entry 202, 203, 204 for each component device driver of the device driver. Each CDT entry contains the address of the component device driver. Upon execution of a device driver to access a corresponding device, the device control block is accessed to determine the size of buffers needed by the device driver during execution, and to locate the call-down table. The call-down table has the location of each component device driver within the device driver and the location of each component device driver buffer having work space for the corresponding component device driver. The call-down table is accessed to invoke each component device driver therein. Each component device driver performs a function of the device driver in accessing the corresponding device, using the corresponding component device driver buffer as work space. Because execution of a device driver occurs after the component device drivers have been configured into layers within the device driver, the call-down table represents the component device drivers to be called during execution of the device driver.

The file system driver identifies an input/output packet (IOP) buffer 220 when passing a request to the input/output supervisor (IOS) to retrieve or store data. The IOP buffer 220 contains an IOS buffer 221, an input/output request (IOR) buffer 222, and component device driver (CDD) buffers 223, 224, and 225. The IOS uses the IOS buffer 221 to store its internal state information. The IOS stores a description of the I/O request received from an application into the IOR buffer 222. Each component device driver accesses the IOR buffer to determine the request. The IOR buffer size is determined by the IOS. Each of these component device driver buffers is used to provide work space to the corresponding component device driver. The component device driver buffers are collectively referred to as the device driver (DD) buffer 226.

Figure 3:
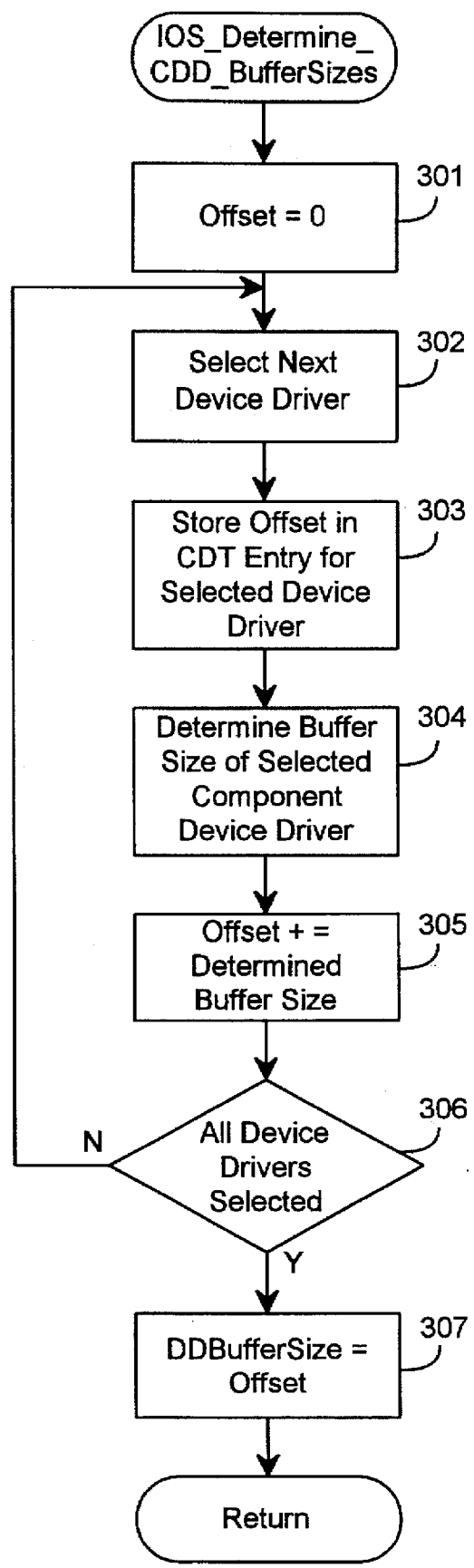
FIG. 3 is a flow diagram of a routine for determining the buffer sizes and buffer offsets of component device drivers.

FIG. 3 is a flow diagram of a routine for determining the buffer size requirements and buffer offsets of the component device drivers. This routine, called IOS_determine_CDD_buffersizes, is invoked by the IOS upon execution of a device driver to access a corresponding device. For each component device driver listed in the call-down table, the routine determines the buffer size requirements and inserts in the call-down table an offset from the beginning of the device driver buffer 226. The offset indicates the start of the component device driver buffer work space for the corresponding component device driver. In step 301, the routine sets a variable, called offset, equal to zero. The variable offset is used to track the offset of a component device driver buffer from the beginning of the device driver buffer 226. In steps 302–306, the routine performs a loop, determining the size of each component device driver buffer and updating the call-down table accordingly. In step 302, the routine selects the next component device driver by referencing the component device driver in the call-down table via the device control block, starting with the "bottom most" component device driver. The bottom most component device driver is, in the example of FIG. 1, component device driver 108. In step 303, the routine stores the variable offset in the CDT entry for the selected component device driver. In step 304, the routine determines the buffer size of the selected component device driver. The buffer size requirement of the selected component device driver may be determined by requesting the buffer size requirement from the selected component device driver each time this routine is invoked. Thus, each component device driver can dynamically determine its memory needs. Alternatively, the buffer size requirement could be determined once at system startup.

In step 305, the routine increases the variable offset by the determined buffer size requirement of the selected component device driver. In step 306, if all component device drivers have already been selected, the routine continues at step 307. Otherwise, the routine loops to step 302 to select the next component device driver. In step 307, the routine sets the total size of the device driver buffer to equal the variable offset, e.g. the bottom of the buffer, and the routine returns. By increasing the variable offset by the relevant buffer size requirement during each execution of the loop, the offset denotes the location of each next component device driver's buffer in the IOP buffer and, upon exiting the loop, the total size of the device driver buffer.

Figure 4:
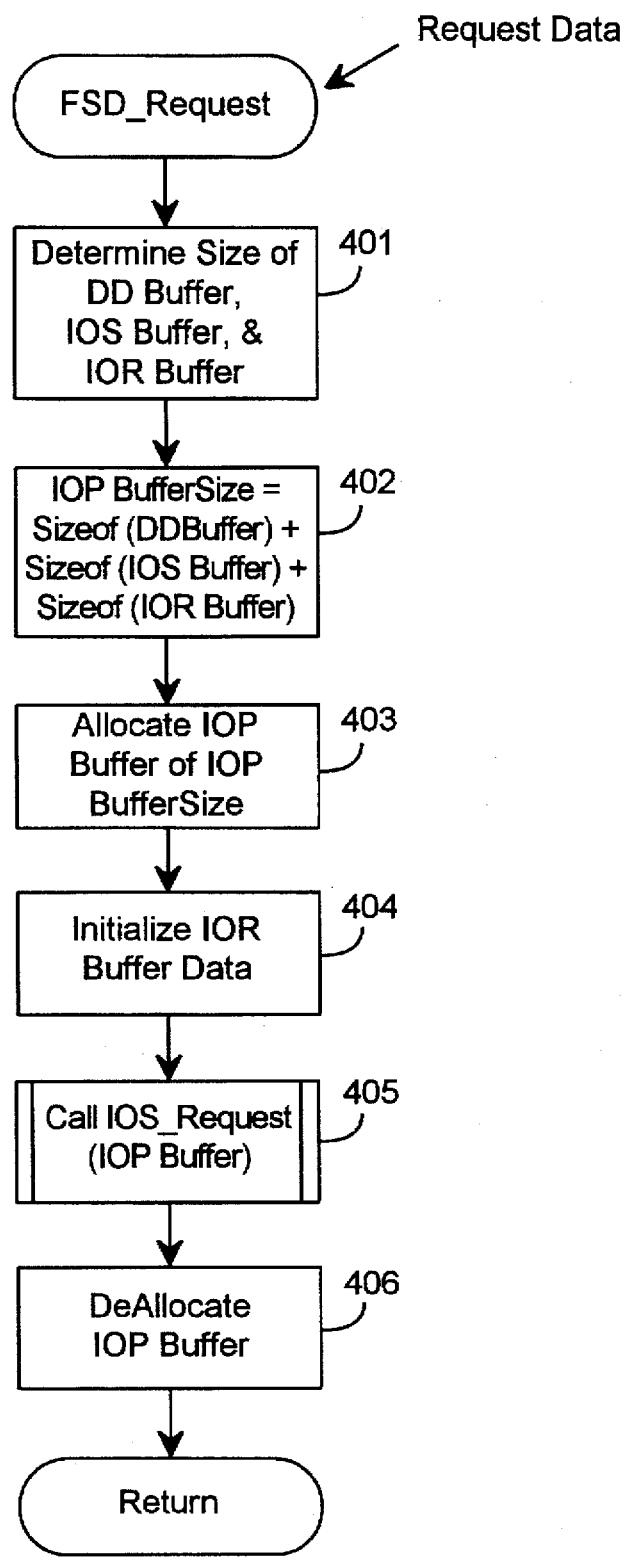
FIG. 4 is a flow diagram of a routine for allocating memory to perform an I/O operation.
Figure 5:
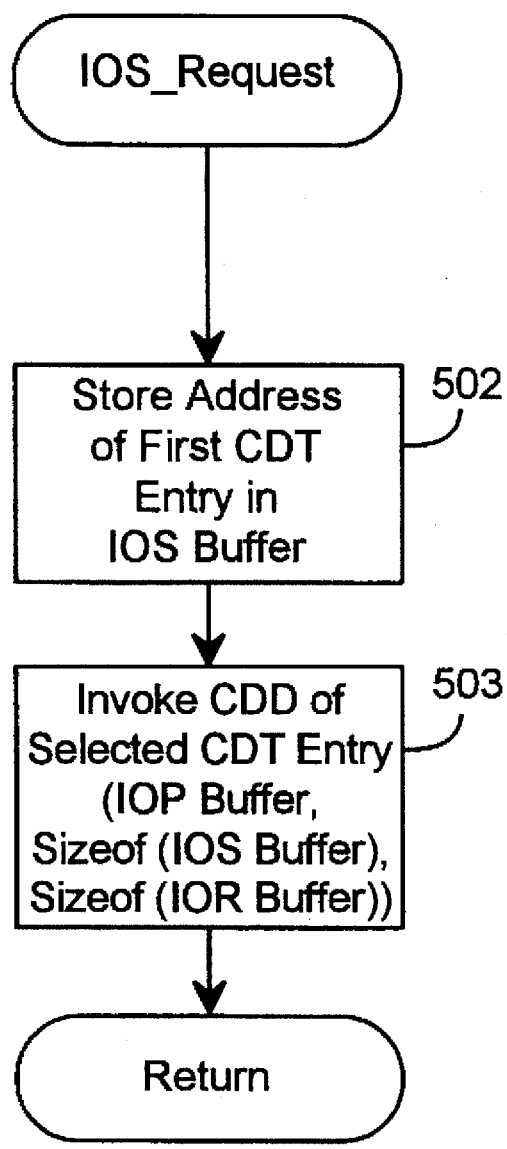
FIG. 5 is a flow diagram of a routine for processing an I/O request.
Figure 6:
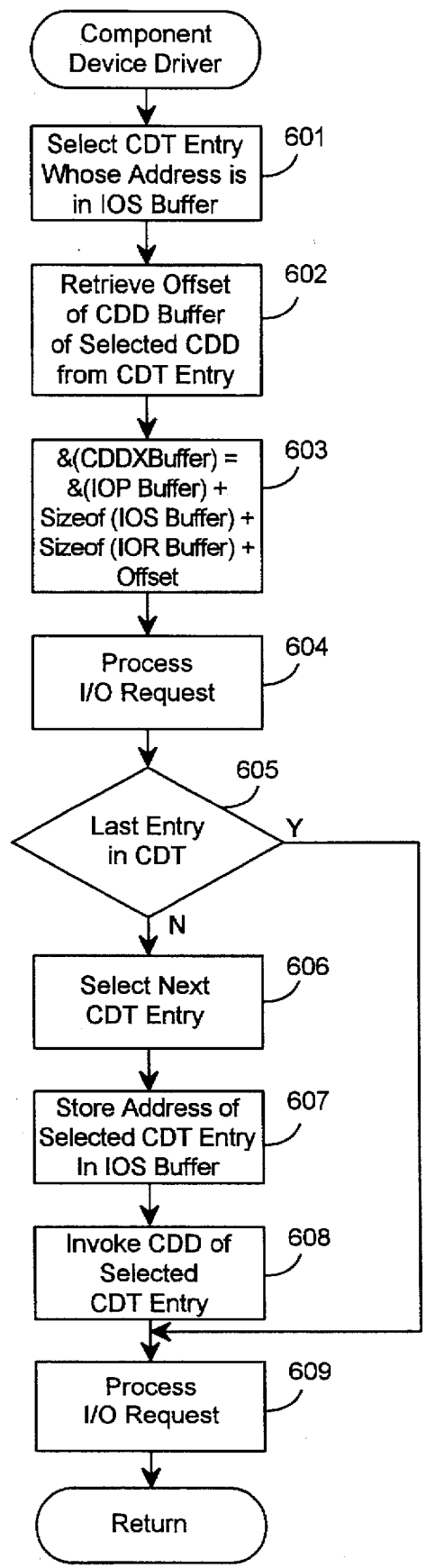
FIG. 6 is a flow diagram representing the processing performed by a device driver.

FIGS. 4–6 illustrate the processing of an I/O request by a device driver using the collective buffer to provide work space for each component device driver within the device driver. FIG. 4 shows the FSD_Request routine performed by the File System Driver upon receiving a request to perform and I/O operation. This routine determines the size of the buffers necessary for the appropriate Device Driver to process the request, allocates memory for these buffers, calls the IOS_Request routine shown in FIG. 5 to process the request, and then deallocates the memory. The IOS_Request routine in FIG. 5 selects the first component device driver in the device driver, calling the component device driver routine shown in FIG. 6 to invoke the component device driver. FIG. 6 shows the process performed by an invoked component device driver, which includes processing the I/O request by performing a component device driver-specific function such as encryption, etc., and invoking, where appropriate, a next component device driver to perform another component device driver-specific function. Each component device driver calculates an address of a corresponding component device driver buffer based on a corresponding offset and uses the corresponding component device driver buffer as work space while performing its component device driver-specific function.

FIG. 4 is a flow diagram of a routine for allocating memory to perform an I/O operation. This routine, called FSD_Request, is part of the file system driver (FSD) and is invoked upon a request by an application program to perform an I/O operation. The routine receives file system requests from an application program and processes the requests. The routine allocates an IOP buffer, initializes the IOR buffer data, invokes the IOS passing it a pointer to the IOP buffer, and deallocates the IOP buffer.

In step 401, the routine determines the size of the device driver buffer, the IOS buffer, and the IOR buffer. In a preferred embodiment, the FSD determines these sizes by requesting the data from the IOS. The IOS determines the buffer size, which varies based on the number and type of component device drivers. This is preferably done by the IOS by invoking the IOS_determine_CDD_buffersizes routine. In step 402, the routine determines the size of the IOP buffer. The size of the IOP buffer is the total size of the device driver buffer plus the size of the IOS buffer plus the size of the IOR buffer. In step 403, the routine allocates an IOP buffer of the determined IOP buffer size. This allocation is essentially the identification of memory space adequate to accommodate the buffer requirements. Memory allocation of buffers is well known to one of ordinary skill. In step 404, the routine initializes the IOR buffer. This initialization stores in the IOR buffer information describing the I/O request, which may involve, for example, the translation of a logical file system address to a physical disk address. In step 405, the routine invokes the routine IOS_Request, passing it the IOP buffer. In step 406, the routine deallocates the IOP buffer. The routine then returns.

FIG. 5 is a flow diagram of a routine for processing an I/O request. The routine, called IOS_Request, is invoked by the FSD_Request routine. This routine invokes the component device driver identified in the first CDT entry, passing a pointer to the IOP buffer. In step 502, the routine stores in the IOS buffer the address of the first CDT entry in the call-down table. In step 503, the routine invokes the component device driver of the selected CDT entry, passing the IOP buffer, the size of the IOS buffer, and the size of the IOR buffer. The routine then returns.

FIG. 6 is a flow diagram representing the processing performed by a component device driver routine. The "top most" component device driver routine is invoked by the FSD_Request routine to process an I/O request to access a corresponding device. The topmost component device driver then invokes the next lower component device driver, which invokes the next lower component device driver. In step 601, the routine selects the CDT entry whose address is in the IOS buffer. This address corresponds to the entry for the component device driver itself, and denotes the address of a first component device driver in the device driver. In step 602, the routine retrieves from the selected CDT entry the offset of the component device driver buffer. In step 603, the routine determines the address of the buffer for this component device driver by adding the offset to a base address. The base address is the address of the IOP buffer plus the size of the IOS buffer plus the size of the IOR buffer. In step 604, the routine processes the I/O request by performing a component device driver-specific function. This function may involve, for example, retrieving data from the disk cache buffer or encrypting data.

In step 605, if the selected CDT entry is the last entry in the CDT, then the routine continues at step 609. Otherwise, the routine continues at step 606. In step 606, the routine selects the next CDT entry. In step 607, the routine stores the address of the selected CDT entry in the IOS buffer. In step 608, the routine invokes the component device driver of the selected CDT entry, passing it a pointer to the IOP buffer, the size of the IOS buffer, and the size of the IOR buffer. Each component device driver performs as described in FIG. 6, except that for each component device driver, a different component device driver-specific function is performed. In step 609, the routine performs component device driver-specific processing of the I/O request for the final component device driver in the device driver. This processing may involve, for example, storing data in the disk cache buffer or decrypting data. The routine then returns.

Although the present invention has been described in terms of a preferred embodiment, it is not intended that the invention be limited to this embodiment, and modification within the spirit of the invention will be apparent to those skilled in the art. The scope of the present invention is defined by the claims that follow.

We claim:

1. A method in a computer system of allocating memory for a plurality of related software routines that are part of a program, each software routine having memory requirements, the method comprising the steps of:

requesting from each of the software routines a required buffer size required of the software routine;

receiving required buffer sizes from each of the software routines in response to the requesting;

determining a collective buffer size as a sum of the required buffer sizes of the software routines;

dynamically allocating memory to a collective buffer of the collective buffer size; and performing the software routines, in performing the software routines, each software routine determines a corresponding portion of the collective buffer it needs and uses the corresponding portion of the collective buffer to satisfy the memory requirements of the software routine.

2. The method according to claim 1 further comprising, after the step of dynamically allocating memory, the step of assigning a software routine buffer offset to each of the software routines, the software routine buffer offset for locating within the collective buffer a work space corresponding to each of the software routines.

3. The method according to claim 2 wherein the step of performing the software routines performs each software routine utilizing as work space a portion of the collective buffer identified by the corresponding software routine buffer offset into the collective buffer.

4. The method according to claim 2 wherein the step of assigning a software routine buffer offset to each of the software routines includes accumulating the received memory requirements of each of the software routines into the total of the memory requirements of the software routines.

5. The method according to claim 1 wherein the step of determining the collective buffer size includes accumulating the received memory requirements of each software routine to obtain the collective buffer size.

6. The method according to claim 1, further comprising the step of deallocating the memory for the collective buffer after performing the software routines.

7. A method in a computer system of allocating memory for component device drivers, each component device driver having memory requirements, the method comprising the steps of:

organizing the component device drivers into layers composing a device driver;

receiving from each of the component device drivers a buffer size requirement for the component device driver;

determining a device driver buffer size to be equal to the sum of the buffer size requirements received from the component device drivers;

dynamically allocating memory to a device driver buffer of the device driver buffer size; and executing the component device drivers so that the memory allocated to the device driver buffer is used to satisfy the memory requirements of the device drivers.

8. The method according to claim 7 further comprising, after the step of dynamically allocating memory, the step of assigning, relative to the device driver buffer, device driver buffer offsets, each for locating work space within the device driver buffer corresponding to each of the component device drivers.

9. The method according to claim 8 wherein the step of executing the component device drivers executes each of the component device drivers utilizing as work space a portion of each of the device driver buffers identified by a corresponding one of the device driver buffer offsets.

10. The method according to claim 8 wherein the step of assigning the device driver buffer offsets for each of the component device drivers includes accumulating the received memory requirements of each of the component device drivers and assigning the accumulated memory requirements as device driver buffer offsets for each of the component device drivers.

11. The method according to claim 7 wherein the step of determining the device driver buffer size includes accumulating the received memory requirements of each component device driver to obtain the device driver buffer size.

12. The method according to claim 7, wherein the step of determining the device driver buffer size determines the device driver buffer size during configuration of the component device drivers.

13. A method in a computer system of allocating memory needed to process an I/O request from an application program, the method comprising the steps of:

receiving the I/O request from the application program;

selecting component device drivers to process the I/O request;

determining a device driver buffer size sufficient to satisfy memory requirements of the selected component device drivers based on receiving from each of the selected component device drivers a memory requirement for that component device driver;

dynamically allocating the memory to a device driver buffer of the determined device driver buffer size; and invoking the selected component device drivers to process the I/O requests utilizing the allocated device driver buffer.

14. The method according to claim 13 further comprising, after the step of dynamically allocating the memory, the step of assigning a component device driver buffer offset to each of the component device drivers, the component device driver buffer offset for locating within the device driver buffer a work space corresponding to each of the selected component device drivers.

15. The method according to claim 14 wherein each invoked component device driver uses as work space a portion the allocated device driver buffer.

16. The method according to claim 14 wherein each invoked component device driver locates work space within the device driver buffer by adding the corresponding component device driver buffer offset to a base address indicating the beginning of the allocated device driver buffer.

17. A computer-readable medium holding computer-executable instructions for performing a method in a computer system of allocating memory for a plurality of related software routines that are part of a program, each software routine having memory requirements, the method comprising the steps of:

requesting from each of the software routines a required buffer size required of the software routine;

receiving required buffer sizes from each of the software routines in response to the requesting;

determining a collective buffer size as a sum of the required buffer sizes of the software routines;

dynamically allocating memory to a collective buffer of the collective buffer size; and performing the software routines, in performing the software routines, each software routine determines a corresponding portion of the collective buffer it needs and uses the corresponding portion of the collective buffer to satisfy the memory requirements of the software routine.

18. The computer-readable medium of claim 17 wherein the method further comprises, after the step of dynamically allocating memory, the step of assigning a software routine buffer offset to each of the software routines, the software routine buffer offset for locating within the collective buffer a work space corresponding to each of the software routines.

19. The computer-readable medium of claim 18 wherein the step of performing the software routines performs each software routine utilizing as work space a portion of the collective buffer identified by the corresponding software routine buffer offset into the collective buffer.

20. The computer-readable medium of claim 18 wherein the step of assigning a software routine buffer offset to each of the soft-ware routines includes accumulating the received memory requirements of each of the software routines into the total of the memory requirements of the software routines.

21. The computer-readable medium of claim 17 wherein the step of determining the collective buffer size includes accumulating the received memory requirements of each software routine to obtain the collective buffer size.

22. The computer-readable medium of claim 17 wherein the method further comprises the step of deallocating the memory for the collective buffer after performing the software routines.

23. A computer-readable medium holding computer-executable instructions for performing a method in a computer system of allocating memory for component device drivers, each component device driver having memory requirements, the method comprising the steps of:

organizing the component device drivers into layers composing a device driver;

receiving from each of the component device drivers a buffer size requirement for the component device driver;

determining a device driver buffer size to be equal to the sum of the buffer size requirements received from the component device drivers;

dynamically allocating memory to a device driver buffer of the device driver buffer size; and executing the component device drivers so that the memory allocated to the device driver buffer is used to satisfy the memory requirements of the device drivers.

24. The computer-readable medium of claim 23 wherein the method further comprises, after the step of dynamically allocating memory, the step of assigning, relative to the device driver buffer, device driver buffer offsets, each for locating work space within the device driver buffer corresponding to each of the component device drivers.

25. The computer-readable medium of claim 24 wherein the step of executing the component device drivers executes each of the component device drivers utilizing as work space a portion of each of the device driver buffers identified by a corresponding one of the device driver buffer offsets.

26. The computer-readable medium of claim 24 wherein the step of assigning the device driver buffer offsets for each of the component device drivers includes accumulating the received memory requirements of each of the component device drivers and assigning the accumulated memory requirements as device driver buffer offsets for each of the component device drivers.

27. The computer-readable medium of claim 23 wherein the step of determining the device driver buffer size includes accumulating the received memory requirements of each component device driver to obtain the device driver buffer size.

28. The computer-readable medium of claim 23 wherein the step of determining the device driver buffer size determines the device driver buffer size during configuration of the component device drivers.

29. A computer-readable medium holding computer-executable instructions for performing a method in a computer system of allocating memory needed to process an I/O request from an application program, the method comprising the steps of:

receiving the I/O request from the application program;

selecting component device drivers to process the I/O request;

determining a device driver buffer size sufficient to satisfy memory requirements of the selected component device drivers based on receiving from each of the selected component device drivers a memory requirement for that component device driver;

dynamically allocating the memory to a device driver buffer of the determined device driver buffer size; and invoking the selected component device drivers to process the I/O requests utilizing the allocated device driver buffer.

30. The computer-readable medium of claim 29 wherein the method further comprises, after the step of dynamically allocating the memory, the step of assigning a component device driver buffer offset to each of the component device drivers, the component device driver buffer offset for locating within the device driver buffer a work space corresponding to each of the selected component device drivers.

31. The computer-readable medium of claim 30 wherein each invoked component device driver uses as work space a portion of the allocated device driver buffer.

32. The computer-readable medium of claim 30 wherein each invoked component device driver locates work space within the device driver buffer by adding the corresponding component device driver buffer offset to a base address indicating the beginning of the allocated device driver buffer.

* * * * *